United States Patent [19]

Schwäertzel et al.

[11] 4,321,703
[45] Mar. 23, 1982

[54] TRANSMISSION SYSTEM FOR TELECOPYING AND ELECTRONIC TRANSMISSION OF IN-HOUSE MAIL

[75] Inventors: Heinz Schwäertzel; Hans Unterberger, both of Munich, Fed. Rep. of Germany

[73] Assignee: Siemens Aktiengesellschaft, Berlin & Munich, Fed. Rep. of Germany

[21] Appl. No.: 62,145

[22] Filed: Jul. 30, 1979

[30] Foreign Application Priority Data

Sep. 29, 1978 [DE] Fed. Rep. of Germany ....... 2842647

[51] Int. Cl.³ .............................. H04J 6/00; H04J 3/02
[52] U.S. Cl. ........................................ 370/89; 370/93; 358/258
[58] Field of Search ...................... 370/89, 88, 86, 93; 358/257, 280, 258

[56] References Cited

U.S. PATENT DOCUMENTS

| | | | |
|---|---|---|---|
| 3,586,782 | 6/1971 | Thomas | 370/89 |
| 3,678,180 | 7/1972 | Bond | 358/257 |
| 3,731,002 | 5/1973 | Pierce | 370/88 |
| 3,755,786 | 8/1973 | Dixon et al. | 370/89 |
| 3,890,471 | 6/1975 | Hachenburg | 370/88 |

*Primary Examiner*—Douglas W. Olms
*Attorney, Agent, or Firm*—Hill, Van Santen, Steadman, Chiara & Simpson

[57] ABSTRACT

A transmission system for telecopying and for distribution of in-house mail incorporates an electronic transmission system formed as a ring circuit, interconnecting a number of terminal devices which can transmit and receive messages. Information originating with the terminal devices circulates in the ring circuit until it reaches the receiver for which it is addressed, at which time it is erased. The transmission system may be employed to transmit the same information to a plurality of terminals, or to deliver a plurality of copies of the document to one terminal.

16 Claims, 2 Drawing Figures

○ TLN

4,321,703

TRANSMISSION SYSTEM FOR TELECOPYING AND ELECTRONIC TRANSMISSION OF IN-HOUSE MAIL

FIELD OF THE INVENTION

The present invention relates to a transmission system for telecopying and for the electronic transmission of in-house mail, and more particularly to such a system employing multiplex transmission.

THE PRIOR ART

Telecopying systems have become commercially available in recent years, and are being used more and more commonly for transmission of documents and the like over electronic transmission lines. The speed of transmission is very rapid, compared to any physical delivery of documentary material. When appropriately designed, the same basic system can be employed within a company or within an office for the delivery of in-house mail such as memoranda or the like.

BRIEF DESCRIPTION OF THE PRESENT INVENTION

It is a principal object of the present invention to provide a transmission system by means of which documents may be rapidly transmitted to specific addressees, which documents may be received at their delivery points automatically without requiring the assistance of an operator at that location.

It is another object of the present invention to provide a transmission system by which the same information may be transmitted to a plurality of subscribers.

Another object of the present invention is to provide such a system which makes it possible to deliver a plurality of copies to a single subscriber.

Another object of the present invention is to provide such a system in which the security of the system with respect to confidentiality of the information transmitted corresponds to the security of conventional in-house mail.

In one embodiment of the present invention, a transmission system is employed having at least one exchange in a plurality of subscriber terminal devices connected with each other by way of a ring circuit and a plurality of branching devices individually connecting the terminal devices with the ring circuit. Communications between terminal devices in random configurations are possible, by way of information blocks for exhibiting one or more recipient addresses, a sender address, and a plurality of sections for the transmitted message. The various sections may conveniently be blocks within successive frames of a time division multiplex system. In such a system, a transmitting device detects the occurrence of a vacant time slot, and fills the vacant time slot with an information block to be transmitted, inserting the information block into the messages transmitted by the ring circuit by way of its respective branching device. Subsequent branching devices receive the information transmitted from the transmitter, detects when the recipient address corresponds to the address of its respective terminal, and either directs the information block to such terminal, removing it from the ring circuit, or transfers it to the next succeeding branching device.

The present invention provides a simple transmission system which does not require any central exchange oriented switching network or the like. The system also has the advantage of informing a sender whether or not information is being received by an addressed receiver. Since the message is removed from the ring circuit when it is received by the addressed receiver, the sender is informed when a data block sent by him is returned to him in unaltered form that the addressed receiver is either not ready to operate or is receiving information from another sender.

These and other objects and advantages of the present invention will become manifest by inspection of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
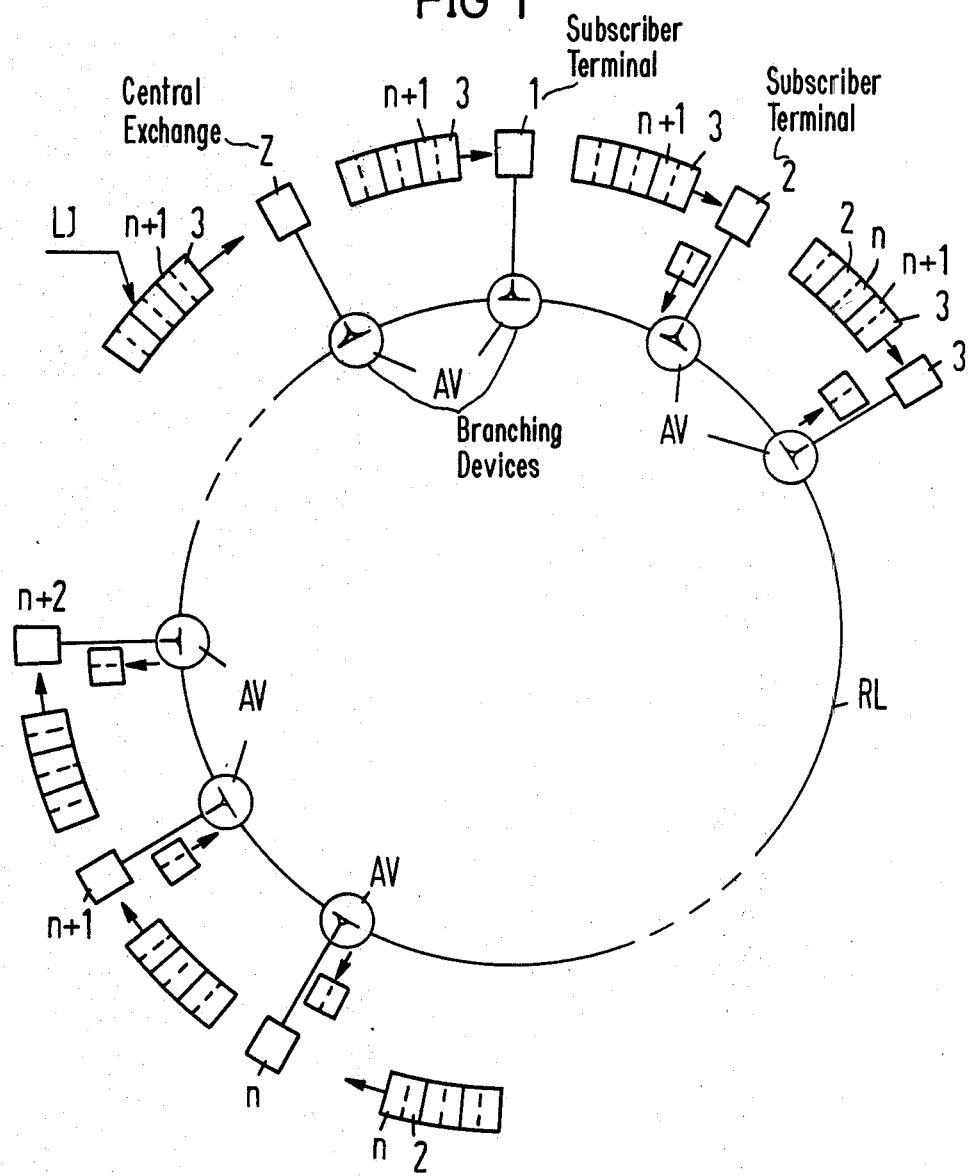
FIG. 1 is a schematic illustration of the construction and operation of an illustrative embodiment of the present invention.

Referring now to FIG. 1, a ring circuit RL is provided by means of a plurality of interconnecting branching circuits AV, each branching circuit being allocated with an individual subscriber terminal device 1, 2, 3, etc. One of the subscriber terminal devices constitutes a central exchange Z, by which the ring may communicate with other terminals (not shown). Exchange Z functions in the same manner as other subscriber terminal devices described hereinafter.

Information is circulated in the ring circuit RL according to a fixed frame grid, such as successive frames of a time multiplex system. Each frame has a plurality of information blocks, and a number of such blocks is shown diagrammatically in FIG. 1 as they might exist at various points in the ring circuit RL. The illustration of FIG. 1 assumes that station 2 is transmitting to station N, and station N+1 is transmitting to station 3.

The frames illustrated between station No. N+1 and station 2 contain a data block with the address of the receiving station, namely, station No. 3, and the address of the transmitting station, namely, station No. N+1. The data block also includes a message, which may be a series of binary bits identifying one or more characters. Subsequent to station No. 2, the following data block is occupied, having been filled by a message transmitted from station No. 2 to station No. N. The block includes the address of station No. N and the address of the sending station No. 2 as well as message units.

At station No. 3, the data block transmitted from station No. N+1 is removed, so that only the data block transmitted by station No. 2 appears on the ring circuit RL subsequent to station No. 3. This data block is removed from the ring circuit by station N, clearing all data blocks between station N and station N+1.

Each of the branching devices AV is provided with means (not shown) for recognizing the address of the subscriber terminal with which it is associated, and when this address is identified as the recipient station, the data block is removed from the line and forwarded to its respective terminal device. Data blocks identifying the terminal as the sender are also removed from the line, because their recognition identifies the condition in which the data block was not received by the addressed recipient terminal. Data blocks which do not identify the terminal of a branching device are passed without modification along the ring circuit RL to the next succeeding branching device, whereby they eventually arrive at the address recipient subscriber terminal.

This operation occurs at each of the branching devices AV, so that all of the circulating information blocks are evaluated at all of the branching devices until the addressed subscriber station is reached.

Each of the branching devices AV is also equipped with means (not shown) for identifying an empty data block in each frame, and for inserting information into the data block corresponding to one or more recipient addresses, the sending address, and the message content. Empty data blocks can either be identified by means of information at the beginning of each frame or by examining the blocks within the frame. Because the transmitting operation of each terminal is initiated when an empty data block is recognized, no extensive synchronization procedures are required for synchronizing the transmitting and receiving operations of the various units. The branching devices AV are comparible to those used for Time Division Multiplex Switching as for instance described in "Schaffer, B.: IEEE Conf. on Commun. 1972, Conf. Rec. S. 5-13 to S. 5-18."

Preferably, each of the subscriber terminals is provided with means for storing the identification of the sender of the data blocks being received, so that information being transmitted to a single recipient from a plurality of senders cannot be mixed at the recipient's location. To this end, the storage device which stores the address of the sender of the message being received is referred to when each data block is checked to determine whether it contains the given terminal's address as the recipient. Only those data blocks which identify the recipient terminal and the sending terminal of the message currently being received are accepted, and other data blocks are transferred further along the ring circuit, even though they may identify the recipient terminal. This procedure positively prevents the mixing of message units transmitted from different sending terminals. When an end of transmission signal is received by a recipient terminal from a sending terminal, the storage device storing the identification of the sending terminal may be erased, whereby the receiving terminal is free to receive information from other sending terminals.

The recognition device is preferably in operation continuously, so that reception of transmitted messages may be carried on without the intervention of an operator at the recipient terminal.

The present invention is able to deliver the same information to a plurality of subscribers in two different ways. In a first mode, information may be circulated with a plurality of recipient addresses. In this case, the data block contains the addresses of plural recipients, and when a recipient address is recognized by an appropriate branching circuit AV, the data block is removed from the ring circuit RL, its own address is erased, and the modified data block is returned to the ring circuit RL, providing one or more recipient addresses remain in the data block. When a data block is being received by all of the addressed recipients, the data block is not returned to the ring circuit, thereby freeing the time slot for other transmissions. If the data block is returned to the sender, a condition is indicated in which one or more recipients have not yet received the information. This mode of operation has the advantage of ease of execution at the transmitting terminal, and minimal loading of the ring circuit RL. However, because of the relatively large number of addresses contained within each time slot, the message content of the time slot is significantly reduced.

In a second mode of operation in which the same message is sent to a plurality of subscribers, means is provided at the sending station for storing the addresses of a plurality of recipient terminals. Then the same message is sent to each of the recipient terminals in turn, under control of the storage means. In this mode, each information block has only one receiver address, so that the message content of an information block may be maximized. However, it increases the loading on the ring circuit RL because of the greater number of information blocks which must be transmitted, and it loads the transmitting terminal more greatly for the same reason. If the terminal equipment is provided with means for recognizing and selectively deleting recipient addresses from data blocks, then the first mode of operation described above is more advantageous. However, under certain conditions, a combination of both of the modes is possible, when only some of the subscribers have the additional equipment necessary for operation in the first mode.

Since a single given subscriber terminal device may be used by a number of persons, it is often desirable that a number of copies of the same document be transmitted at the same time. Two different modes of operation can be carried out to achieve this purpose. In a first mode of operation, multiple copies may be transmitted by means of repetition of identical messages by the sending terminal. In this way, the document to be transmitted may be transmitted as often as desired, by repeating the process of transmitting a single document. This mode of operation has the disadvantage, however, of representing a relatively great load on the transmitting terminal and on the ring circuit RL.

In another mode of operation, multiple copies may be produced by repetition at the receiver terminal. In this mode of operation, the sending terminal supplies information to the receiving terminal concerning the number of copies desired, and at the receiver, the incoming information is stored as it is received. After the message units making up the entire document is received, the desired number of copies may be produced by referring to the stored information at the receiving terminal. By use of this mode, the loading of the transmitting device and the ring circuit RL are reduced, but a storage device is necessary having a capacity of approximately $10^6$ bits. For the functions described above the subscriber terminals are equipped with computer intelligence as it can be supplied for example by microprocessors.

The system of the present invention satisfactorily fulfills the security requirements of in-house mail distribution. Two different types of security are important. In the first place, the transmitted documents must reach the recipient terminals, and in the second place, the documents must not be received at terminals to which they are not addressed. Because the documents transmitted by the present invention are transmitted in a plurality of frames, the entire information respecting the document cannot be lost with the loss or non-recognition of a single frame. By means of suitable measures (for example, numbering the information blocks), the receiver terminal can identify the loss of one or more information blocks and request repeated transmission, if desired. Since the receiver terminals are uniquely addressed by address information contained within the information block, each receiver terminal cannot fail to recognize these data blocks addressed to it. The certainty of this recognition may be increased by means of a redundant coding process for coding the addresses of the recipient terminals.

By use of a strict allocation of addresses to the receiving stations, and a redundant coding process for coding the recipient addresses, certainty may be had that the messages are not received at stations which are not recipient stations. The quality of the protection in this regard may be materially increased by increasing the complexity of the coding of the recipient addresses. For most purposes, however, a simple coding scheme achieves the security required for in-house mail, such as memoranda and the like.

The bandwidth which is employed for the data transmission on the ring circuit RL is fixed by requirements of transmission quality and transmission duration. If the document to be transmitted is a DIN A4 page, approximately $10^6$ bits are required for a black and white transmission with a resolution of 3.8 points per mm. Given a transmission time of 10 seconds per document, a bandwidth requirement of 100 k bits per transmission channel is required. This bandwidth can be reduced by a factor of between 2 and 10 by means of reduction algorithms. Since, however, there is a potential demand for transmission of grey tones, or color, the required bandwidth may be greater than 100 k bits per second.

In designing the system of the present invention, the transmission capacity of the system is determined by the number of subscribers to be served, and the type of transmission lines employed for the ring circuit RL is selected to satisfy the transmission capacity requirement. If the selected transmission speed is 100 k bits per second, then a relatively large investment must be made when electrical transmission lines are used in order to make a great number of transmission channels available. It is therefore preferable to use transmission lines which take the form of light wave guides and the like, by which a greater number of transmission channels can be made available.

With light wave guides, an economical transmission of up to 100 M bits per second is possible without taking special measures. It is then possible to provide 500 transmission channels for information transmission, and up to 8000 subscriber stations can be connected with a traffic volume of 0.06 erlangs, even assuming losses of 1%.

When the traffic volume is 0.3 erlangs per subscriber station, up to 1600 stations can still be connected with a light wave guide.

Figure 2:
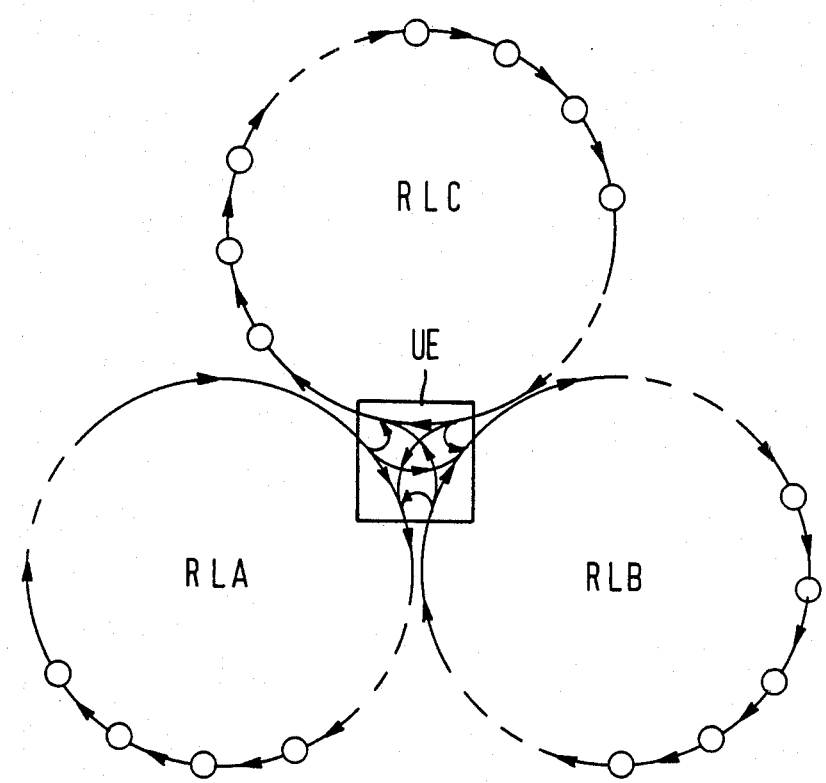
FIG. 2 is a schematic illustration of a modified embodiment of the present invention.

Greater numbers of subscribers can be accommodated when a plurality of rings are used, as illustrated in FIG. 2. In FIG. 2, each subscriber is identified with a circle TLN, and a plurality of subscribers are grouped into three separated rings identified as RLA, RLB and RLC. The rings are interconnected by means of transfer stations UE, each of which have substantially the same function as the branching devices AV as shown in FIG. 1, namely, to recognize what information is to be transferred into another ring and to clear the data block in one ring when its information content is transferred to another ring. By means of the interconnecting rings of FIG. 2, a very large number of subscribers may be accommodated, greatly exceeding the transmission capacity of any given ring circuit.

Although the present invention has been described above particularly in terms of time division multiplex, other multiplex processes may be employed such as space division multiplex and frequency division multiplex. Because telecopying and electronic in-house mail involve fundamentally the same type of data transmission, both features can conveniently be combined into a single system incorporating the present invention.

It will be appreciated by those skilled in the art, that the present invention may be employed with a variety of different kinds of apparatus for carrying out the required functions such as address recognition, branching to and from the ring circuit, and the like. As suitable apparatus for performing these functions is well known to those skilled in the art, the specific construction of such apparatus need not be described in detail.

Various modifications and additions may be made in the system of the present invention without departing from the features of novelty thereof, which are intended to be defined and secured by the appended claims.

What is claimed is:

1. In a transmission system for telecopying and for the electronic transmission of in-house mail, the method comprising the steps of interconnecting a plurality of subscriber terminal devices with a ring circuit by means of a plurality of branching devices individually allocated to said terminals, said terminals being adapted to transmit and receive information blocks according to a fixed frame grid, each of said information blocks including a receiver address, a sender address, and a message, said terminals being adapted to insert an information block within a free time slot of said fixed frame grid, and causing said branching device to sense the receiver address of each information block, and to remove such information block from the information flow upon recognition of the receiver address or the sender address allocated to it, and to transfer said information block upon recognition of a different receiver address and a different sender address.

2. The method according to claim 1, including the step of repeatedly transmitting information from a sender terminal to a receiver terminal in accordance with the number of copies desired at the receiver station.

3. The method according to claim 2, including the step of storing a representation of the number of copies desired to be produced at a receiving station, and automatically repeating transmission of said message at said sender terminal said number of times.

4. The method according to claim 1, including the step of including in said information block at said sender terminal data concerning the number of copies to be produced at said receiving terminal, and reproducing a number of copies at said receiving terminal in accordance with said number.

5. The method according to claim 4, including the step of automatically reproducing the required number of copies in response to receiving data corresponding to said number from said transmitting terminal.

6. The method according to claim 1, including the step of inserting identifying plural receiver addresses into said data block, and selectively deleting each of said receiver addresses when said data block is received at corresponding receiver terminals.

7. The method according to claim 1, including the step of automatically operating said receiver terminal in response to recognition of its respective receiver address.

8. The method according to claim 1, including the step of operating said ring circuit as a time division multiplex system.

9. The method according to claim 1, including the step of providing a plurality of ring circuits, each of said ring circuits interconnecting a plurality of subscriber terminals, and providing a transfer station joining a pair of said rings by which the station on one ring circuit communicates with the station on another ring circuit.

10. The method according to claim 1, including the step of employing a light wave guide as a transmission line for said ring circuit.

11. In a transmission system for telecopying and for the electronic transmission of in-house mail, the method comprising the steps of interconnecting a plurality of subscriber terminal devices with a ring circuit by means of a plurality of branching devices individually allocated to said terminals, said terminals being adapted to transmit and receive information blocks according to a fixed frame grid, each of said information blocks including a plurality of receiver addresses, a sender address, and a message, said terminals being adapted to insert an information block within a free time slot of said fixed frame grid, and causing said branching device to sense the receiver address of each information block, and to remove the receiver addresses allocated to it, and to remove such information block from the information flow if the receiver address allocated to it is the only receiver address of said data block, and to transfer said information block upon recognition of a different receiver address.

12. The method according to claim 11, including the step of removing said information block from the information flow upon recognition of the sender address allocated to the recognizing station.

13. The method according to claim 11, including the step of automatically operating said receiver terminal in response to recognition of its respective receiver address.

14. The method according to claim 11, including the step of operating said ring circuit as a time division multiplex system.

15. The method according to claim 11, including the step of providing a plurality of ring circuits, each of said ring circuits interconnecting a plurality of subscriber terminals, and providing a transfer station joining a pair of said rings by which the station on one ring circuit communicates with the station of another ring circuit.

16. The method according to claim 11, including the step of employing a light wave guide as a transmission line for said ring circuit.

* * * * *